United States Patent [19]
Nagelmeyer

[11] 4,213,769
[45] Jul. 22, 1980

[54] ENERGY TRANSFER AND AIR PURIFYING DEVICES

[76] Inventor: Edward B. Nagelmeyer, 20 Summit Dr., Wayne, N.J. 07470

[21] Appl. No.: 916,444

[22] Filed: Jun. 19, 1978

[51] Int. Cl.² .............................................. B01D 47/02
[52] U.S. Cl. ....................................... 55/216; 55/244; 55/309; 261/122; 261/DIG. 9
[58] Field of Search .......................... 261/DIG. 9, 122; 55/216, 244-256, 309-314; 137/115, 101.27

[56] References Cited

U.S. PATENT DOCUMENTS

| | | | |
|---|---|---|---|
| 763,843 | 6/1904 | Belt | 55/216 |
| 3,504,481 | 4/1970 | Zakarian et al. | 261/DIG. 9 |
| 3,520,662 | 7/1970 | Marks | 261/DIG. 9 |
| 3,893,829 | 7/1975 | Valentino | 55/310 |

FOREIGN PATENT DOCUMENTS 717246 10/1966 Italy .......................................... 55/255

*Primary Examiner*—Frank Sever
*Attorney, Agent, or Firm*—David A. Jackson

[57] ABSTRACT

An energy transfer and air purifying device is provided, comprising a liquid bath, means for containing the liquid bath, the means including at least one opening therein, exhaust means in fluid communication with the liquid bath, the exhaust means partially extending into the liquid bath and defining a fluid space between the containing means and the exhaust means, the exhaust means also including an outlet means, guide means associated with the exhaust means for guiding contaminated gas to the fluid space, the guide means including an upper limiting member, and a pressure-differential means associated with the liquid bath for changing the fluid level of the bath for forcing a contaminated gas through the liquid bath and the exhaust means, wherein the liquid bath interacts with the contaminated gas in a heat exchanging and scrubbing relation.

28 Claims, 9 Drawing Figures

ENERGY TRANSFER AND AIR PURIFYING DEVICES

BACKGROUND OF THE INVENTION

This invention relates to an energy transfer and air purifying device. More particularly, this invention relates to an energy transfer and air purifying device which has particular applicability in the area of energy and environmental conservation.

It is well known in the prior art to provide a water system which scrubs contaminated gas therein. For example, U.S. Pat. No. 3,715,871 to Jones et al discloses a smog eliminator in which flue gases are pumped into a pipe through which water is constantly being circulated. The hot flue gases enter the water in the pipe and are carried to a chimney where they are exhausted. However, such a system is expensive and complex, an insulated pipe extending from the chimney of each house into the pipe. In addition, there are no means for recapturing the lost heat from the chimneys of each house and returning the heat to the house.

Still other prior art devices utilize a liquid spray in order to remove contaminants from a gas. U.S. Pat. No. 3,572,264 to Mercer discloses a method and apparatus for removing smoke and smog in which flue gases travel through a scrubbing tower and are cleansed by a spraying nozzle, the gases then being emitted through a conduit by means of a centrifugal blower. However, the gases do not travel through a liquid medium to obtain a maximum scrubbing action. Rather, a water spray is utilized to cleanse the gases, resulting in a less efficient cleaning action. In addition, the apparatus utilized is of a bulky and complex nature, numerous stages being required to scrub the gases. See also U.S. Pat. No. 3,702,756 to Bowman.

Other prior art devices for purification of gases, such as U.S. Pat. No. 3,485,015 to Vecchio, disclose an exhaust gas scrubber in which gases, under whatever pressure the inlet is subject to, are forced through several liquid baths which remove contaminants from the gas. However, such an apparatus, besides being expensive and bulky, does not provide adequate means for continuously forcing the gas through the middle or second chamber, i.e., the flow of gas through the middle chamber depends largely upon the buildup of gas in the portion of the middle and end chambers above the level of the water. This buildup of gases depends on the rate of flow of gas through the inlet into the end chambers which may be erratic. Moreover, by utilizing a center chamber which is completely open at its lower end, such as shown in FIG. 8 of Vecchio, the apparatus utilized therewith is rendered inefficient. See also U.S. Pat. No. 3,884,653 to Capulli et al. It should be noted that, although U.S. Pat. No. 3,481,115 to Brandt, discloses a fan which changes the water level between two adjacent liquid baths, there is no disclosure of utilizing this feature to transfer gases from the lower chamber to the higher chamber.

Finally, other prior art devices, such as the apparatus described in U.S. Pat. No. 2,981,250 to Stewart, disclose complex heat exchanging and scrubbing apparatus in which hot, contaminated gas is bubbled through a circulating water supply. The water supply is also utilized to heat a radiator system. However, there is no disclosure of utilizing any means for changing the level of the liquid bath and forcing the hot, contaminated gas therethrough. In addition, this patent discloses a complex electrical bypass system for the gas.

Accordingly, it is believed that the present invention provides a unique solution to these aforementioned problems.

SUMMARY OF THE INVENTION

In accordance with the present invention, an energy transfer and air purifying device is provided, comprising a liquid bath, means for containing the liquid bath, the means including at least one opening therein, exhaust means in fluid communication with the bath, the exhaust means partially extending into the liquid bath and defining a fluid space between the containing means and the exhaust means, the exhaust means including an outlet means, guide means associated with the exhaust means for guiding contaminated gas to the fluid space, the guide means including an upper limiting member, and a means associated with the liquid bath for changing the fluid level of the liquid bath for forcing a contaminated gas through the liquid bath and the exhaust means, wherein the liquid bath interacts with the contaminated gas in a heat exchanging and scrubbing relation.

Accordingly, it is a principal object of the present invention to provide an energy transfer and air purifying device which utilizes a liquid bath in an effective heat exchanging and scrubbing relation with a gas.

It is a further object of the present invention to provide an energy transfer and air purifying device in which a pressure-differential means changes the fluid level of a liquid bath for forcing gas through the liquid bath.

It is a still further object of the present invention to provide an energy transfer and air purifying device which utilizes a novel relationship between a liquid bath and a pressure-differential means for forcing a gas to interact with the liquid bath in a heat exchanging and scrubbing relation.

It is a yet further object of the present invention to provide an energy transfer and air purifying device in which openings in the bottom of the exhaust means create a violent scrubbing action of the contaminated gas in the liquid bath.

It is another object of the present invention to provide an energy transfer and air purifying device having a gas escape means responsive to the pressure-differential means for permitting the contaminated gas to escape when the pressure-differential means is inoperative.

It is still another object of the present invention to provide an energy transfer and air purifying device which may be easily utilized with an existing flue stack.

It is yet another object of the present invention to provide an energy transfer and air purifying device which is inexpensive and easy to manufacture.

Further objects and advantages will become apparent to those skilled in the art from the ensuing description which proceeds with reference to the accompanying Figures.

DESCRIPTION OF THE PREFERRED EMBODIMENT

Figure 1:
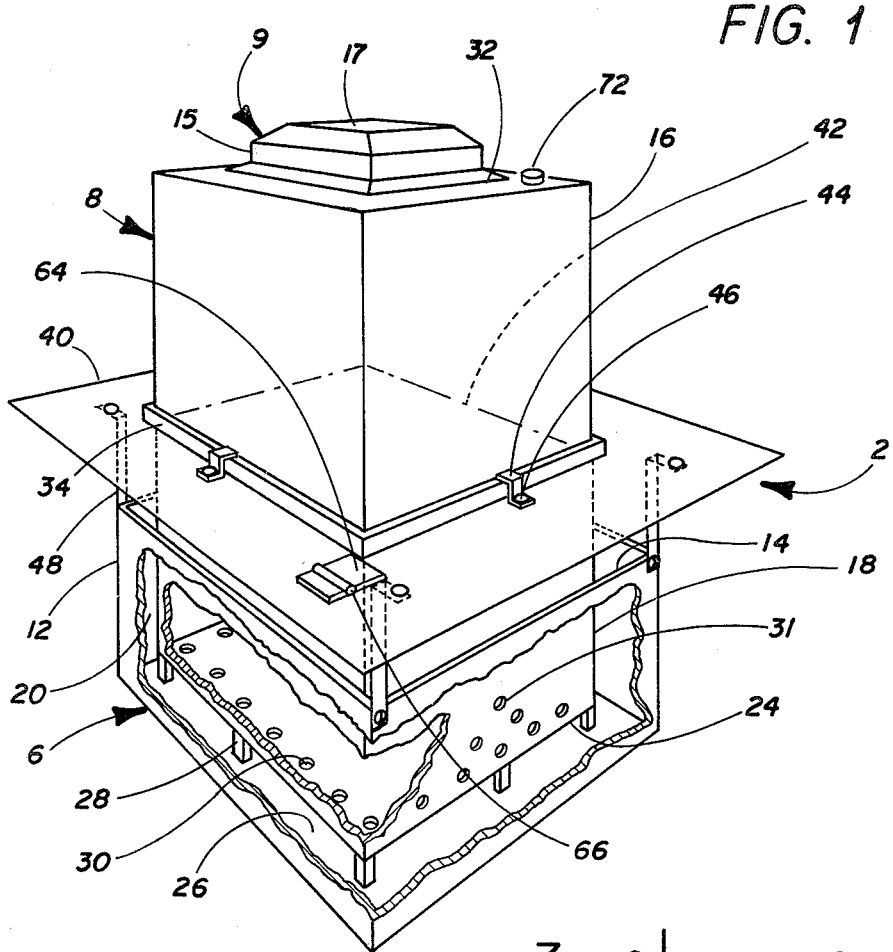
FIG. 1 is a perspective view, partially broken away, of a preferred embodiment of the present invention.
Figure 4:
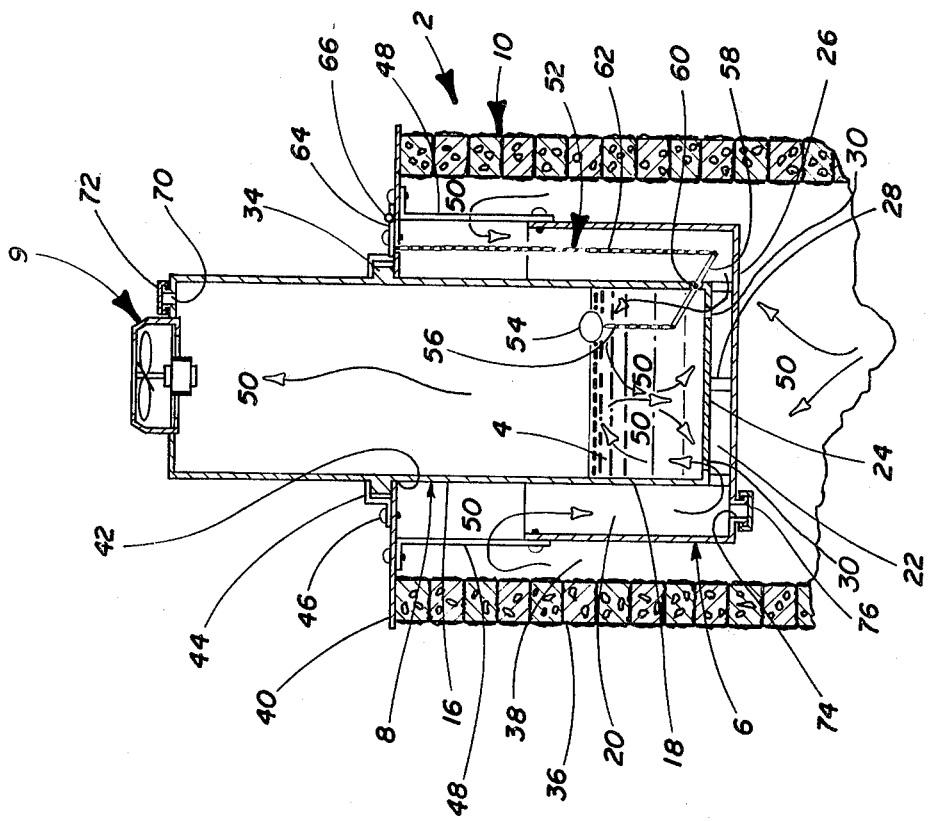
FIG. 4 is an illustration of the device as defined in FIG. 3, during its activated state.

Referring to the drawings, wherein like numerals represent like parts, FIGS. 1 and 4 represent an energy transfer and air purifying device 2 in accordance with the present invention, comprising a liquid 4, means 6 for containing liquid 4, exhaust means 8 in fluid communication with liquid 4 and the atmosphere, guide means 10 surrounding containing means 6 for guiding contaminated gas to liquid 4, and a vacuum means 9 associated with the liquid bath for changing the fluid level of liquid 4 in containing means 6 for forcing contaminated gas through liquid 4 and exhaust means 8, wherein liquid 4 interacts with the contaminated gas in a heat exchanging and scrubbing relation.

Containing means 6 includes any suitable means for containing liquid 4 and includes at least one opening therein. For example, as shown in FIG. 1, containing means 6 includes a substantially rectangular container 12 having an opening 14 at its upper end.

Referring to FIGS. 1 and 4, exhaust means 8 includes an exhaust chamber 16 partially disposed at its lower end 18 within liquid 4. Although exhaust chamber 16 may be of any suitable configuration, it is shown in FIG. 1 as being of a substantially rectangular configuration. In addition, the top plan, cross-sectional dimensions of lower end 18 of exhaust chamber 16 are less than the inner dimensions of container 12, thus defining a fluid space 20 between container 12 and lower end 18 of exhaust chamber 16. A fluid space 22 is also provided between the bottom end plate 24 of exhaust chamber 16 and the bottom end 26 of container 12. The fluid space 22 may be provided by utilizing supporting legs 28 on the bottom of exhaust chamber 16 for supporting the same in container 12.

Figure 3:
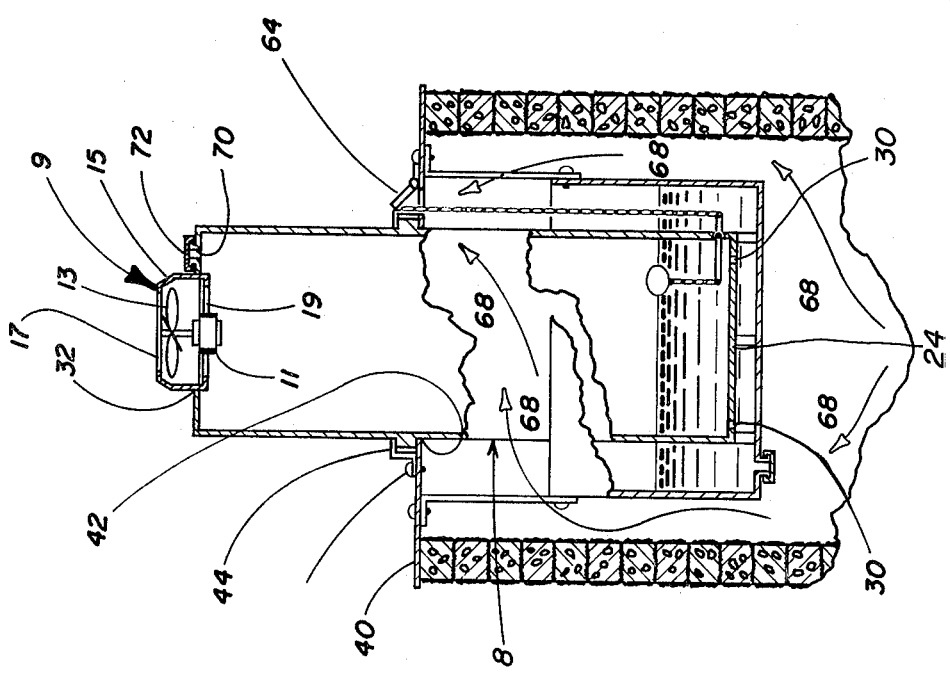
FIG. 3 is a side plan, cross-sectional configuration of the embodiment of FIG. 2, taken along line 3—3, during its unactivated state, and also showing openings in the bottom of the exhaust means.

Exhaust chamber 16 includes a plurality of openings or holes 30 in the bottom end plate 24 thereof, the arrangement and size of these openings to be discussed later. In this manner, it can be seen that when exhaust chamber 16 is partially disposed within liquid bath 4 and container 12, the liquid level in exhaust chamber 16 and fluid space 20 are at the same level when device 2 is not being utilized, as shown in FIG. 3. In addition, exhaust chamber 16 includes a central aperture 32 at its upper end. Exhaust chamber 16 may also include an outer peripheral ledge 34 surrounding chamber 16 near its upper end, to be later discussed.

Figure 5:
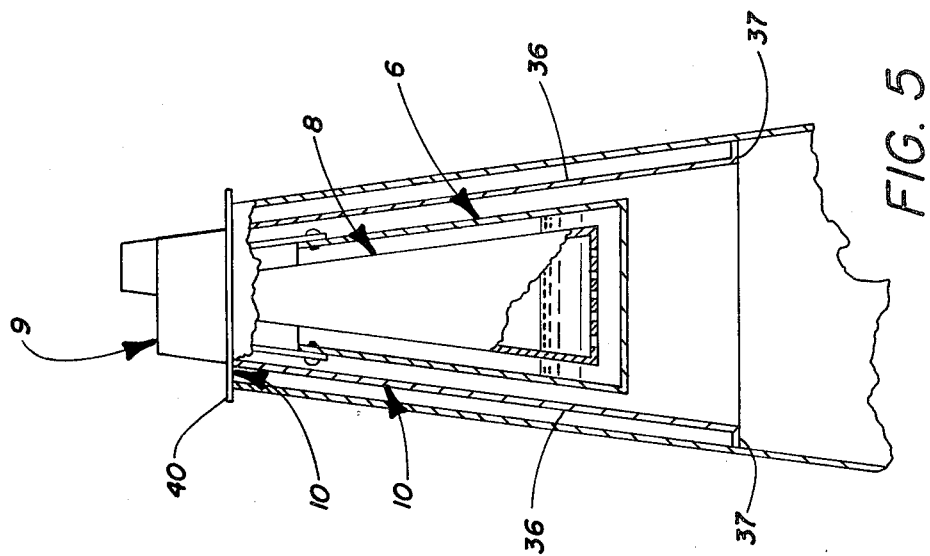
FIG. 5 is a partially broken away side plan, cross-sectional view of an embodiment of the present design in an industrial flue stack, during its unactivated state.

Guide means 10 includes any outer wall 36 surrounding container 12 and defining a fluid space 38 therebetween. For example, outer wall 36 may include any suitable flue stack structure, as shown in FIG. 4 or any separate outer wall structure 36 as shown in the industrial flue stack in FIG. 5. In this latter embodiment, flanges 37 extend from the bottom of wall 36 into contact with the flue stack inner wall to prevent gases from traveling between the flue stack wall and outer wall 36. As shown in FIGS. 1 and 3, guide means 10 also includes an upper limiting member 40 such that outer wall 36 and upper limiting member 40 guide contaminated gas to fluid space 20. Upper limiting member 40 is preferably of a flat rectangular configuration having a central aperture 42 therein, aperture 42 having substantially identical dimensions to the outer periphery of exhaust chamber 16. Upper limiting member 40 also includes Z-members 44 surrounding aperture 42 and pivotally mounted on member 40 by pivot pins 46.

Upper limiting member 40 is preferably attached to container 12 by any suitable means such as L-shaped brackets 48. In this manner, upper limiting member 40 is substantially perpendicular to the sides of container 12.

In utilizing such a construction, as shown in FIG. 1, exhaust chamber 16 may also be supported by upper limiting member 40 as shown in FIGS. 1 and 3. Exhaust chamber 16, being of substantially similar dimensions to aperture 42 of upper limiting member 40, may be disposed therethrough such that openings 30 of exhaust means 16 are disposed within liquid bath 4. When exhaust chamber 16 is disposed within central aperture 42, outer peripheral ledge 34 of exhaust chamber 16, being of a larger dimension than aperture 42, will rest upon upper limiting member 40, thus restraining exhaust chamber 16 in a fixed relation to upper limiting member 40 and container 12. In addition, Z-members 44 may be rotated on upper limiting member 40 to secure outer peripheral ledge 34 and exhaust chamber 16 thereto. In this manner, container 12, exhaust chamber 16 and upper limiting member 40 become a unitary structure which can be supported by upper limiting member 40.

Figure 2:
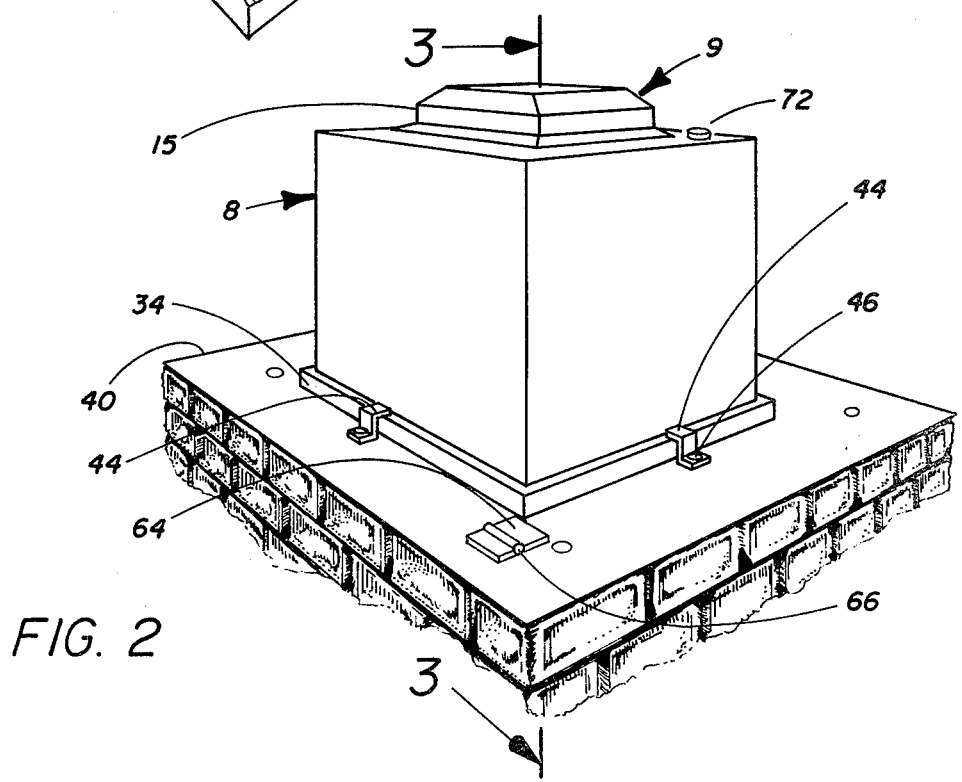
FIG. 2 is a perspective view, further illustrating the device of FIG. 1 in a flue stack.

As shown in FIGS. 2 and 3, upper limiting member 40 is supported on the flue stack, the outer peripheral edge of upper limiting member 40 being at least as large as the outer peripheral edge of the flue stack.

Device 2 also includes a vacuum means 9 associated with liquid bath 4 for changing the fluid level of bath 4 in containing means 6 for forcing contaminated gas through liquid bath 4 and exhaust means 8. Means 9 may include a suitable exhaust fan disposed within central aperture 32 at the upper end of exhaust chamber 16. As shown in FIG. 3, the exhaust fan includes a motor 11 for driving the fan blades 13. The exhaust fan is mounted, by any conventional means, within a fan housing 15 which is fixedly disposed within aperture 32 of exhaust chamber 16. Housing 15 includes an aperture 17 at its top end in fluid communication with the atmosphere and a donut-shaped or toroidal aperture 19 at its lower end, the latter surrounding motor 11 and in fluid communication with the inside of exhaust chamber 16. The exhaust fan must be of sufficient strength to create a vacuum within the portion of exhaust chamber 16 above the level of liquid bath 4 therein.

Alternatively, vacuum means 9 may include any suitable fan or compressor below device 2. Thus, when means 9 is activated, thus creating substantial pressure below device 2 comparable to a vacuum within exhaust chamber 16, the liquid level in exhaust chamber 16 is caused to rise, resulting in a drop in the liquid level in fluid spaces 20 and 22, as shown in FIG. 4. The resulting pressure differential caused by means 9 also forces gas through liquid bath 4 and exhaust chamber 16, as shown by arrows 50 in FIG. 4.

Because of the small dimension of openings 30 in exhaust chamber 16 and because of the arrangement of these openings near the periphery of bottom end 24 of exhaust chamber 16, a maximum scrubbing and heat exchanging effect takes place between liquid bath 4 and the contaminated gas. It has been found that the small size of openings 30 and the arrangement of openings 30 near the periphery of bottom end 24 of exhaust chamber 16 create a turbulent churning of liquid bath 4 in exhaust chamber 16 when means 9 is utilized. This churning effect results in a maximum scrubbing action of liquid bath 4 on the contaminated gas. In addition, the placement of openings 30 results in the movement of gas through liquid bath 4 as shown by arrows 50 in FIG. 4, in which part of the gas exits into chamber 16 above the water level and a portion of the gas is caused to revolve in a circulatory motion in bath 4 in chamber 16. In this manner, a temperature differential between the upper end and periphery of liquid bath 4 and the lower middle portion of liquid bath 4 is created, resulting in maximum heat transfer characteristics between the contaminated gas and liquid 4. In addition, as shown in FIG. 1, openings 31 may be placed in the side walls of chamber 16 at its lower ends, as shown in FIG. 1, in which openings 31 form a substantially triangular configuration on the side walls of chamber 16, the base of the triangle being substantially parallel to the lower end of the side walls of chamber 16.

Device 2 also includes a gas escape means 52, as shown in FIGS. 3 and 4, for utilization when device 2 is not in operation. Escape means 52 may include a float 54 which rests upon the surface of liquid bath 4 within exhaust chamber 16. Attached to the lower end of float 54 is a flexible connecting member 56 such as a chain or the like, connecting member 56 being attached at its opposite end to a link member 58, link member 58 being pivotally attached within an aperture 60 at a corner defined by bottom end 24 and a side of exhaust chamber 16. Link member 58 extends partially within and partially out of exhaust chamber 16. At the end of link member 58 extending out of exhaust chamber 16 is attached a second flexible connecting member 62 such as a chain or the like, connecting member 62 being attached at its opposite end to a damper 64 which is hingably attached by hinge 66 to the upper end of upper limiting member 40. Referring to FIG. 4, it is seen that when means 9 is in operation, thus increasing the liquid level within exhaust chamber 16 and causing float 54 to rise therein, connecting member 62 is pulled taut to prevent damper 64 from opening. Referring to FIG. 3, when means 9 is not in operation, float 54 is at a lower level than the operating level, resulting in a slack in connecting member 62. However, since contaminated gases cannot pass through liquid bath 4 when means 9 is not in operation, the slack in connecting member 62 allows contaminated gas to exit via damper 64 when the pressure of the contaminated gas reaches a certain pressure, as shown by arrows 68 in FIG. 3. Alternatively, it shoud be noted that any suitable means could be utilized as a gas escape means. For example, damper 64 may be controlled by an electric motor and conventional clutch mechanism (not shown), the current through the motor being regulated by the current through vacuum fan 9, such that when fan 9 is not being operated, motor and conventional clutch mechanism (not shown) opens damper 64 and retains the same in that position and when fan 9 is being operated, the motor and clutch mechanism retains damper 64 in a closed position.

In operation, as shown in FIG. 4, when vacuum fan 9 is operative, the liquid within fluid spaces 20 and 22 is caused to enter exhaust chamber 16, resulting in a rise in liquid bath 4 within chamber 16. This increase in fluid level in chamber 16 causes gas escape means 52 to prevent damper 64 from opening. Vacuum fan 9 also creates a vacuum in that portion of exhaust chamber 16 not occupied by liquid which results in the contaminated gas being forced through liquid bath 4 and exhaust chamber 16 via fluid space 38, fluid space 20, fluid space 22 and openings 30. Because of the displacement of openings 30, as previously described, a thorough scrubbing and heat exchanging action occurs between liquid bath 4 and the contaminated gases. The scrubbed gases then are forced to exit exhaust chamber 16 by vacuum fan 9. When vacuum fan 9 is not being utilized, the contaminated gases cannot pass through the liquid in fluid space 20. However, since damper 64 is not restrained in a closed position, the pressure buildup of the contaminated gas in the system will force damper 64 to open to emit these gases into the atmosphere.

In addition, as shown in FIGS. 3 and 4, exhaust chamber 16 may include an inlet opening 70 at its upper end, having a cap 72 releasably attached thereto in any conventional manner such as screw threads or a twist release, such as is commonly found on automobile radiator caps. In this manner, when the fluid level within liquid bath 4 diminishes because of evaporation or any other phenomenon, liquid bath 4 can be replenished by adding liquid through inlet opening 70. In addition, an outlet opening 74 is provided at the bottom of container 12, having a removable cap 76 thereon similar to cap 72. In this manner, when various contaminants clog the system, liquid bath 4 can be drained therefrom and a fresh supply of liquid can be provided.

Figure 6:
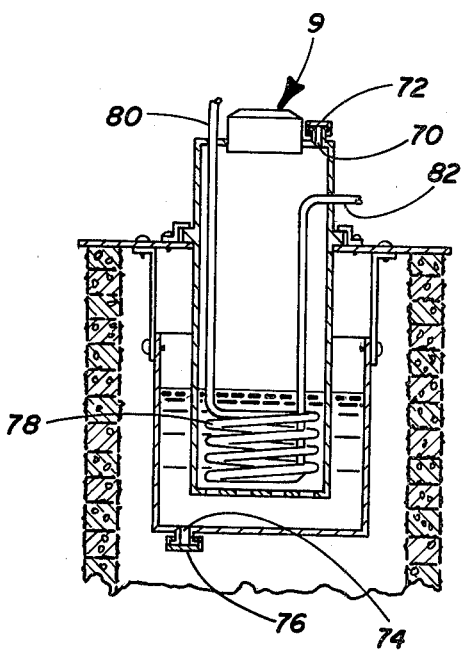
FIG. 6 is a side plan, cross-sectional view of the embodiment of FIG. 3 with a second heat exchanging system therein.

Referring to FIG. 6, exhaust chamber 16 may include a coiled pipe 78 near the lower end thereof such that coiled pipe 78 sits within liquid bath 4 when exhaust fan 9 is in operation. Extending from coiled pipe 78 at one end thereof and out of exhaust chamber 16 is an inlet pipe 80. In addition, an outlet pipe 82 is attached to the opposite end of coiled pipe 78 and extends from exhaust chamber 16. In this manner, fresh water may be pumped into inlet pipe 80, through coiled pipe 78 and out of inlet pipe 80, the water entering inlet pipe 80 being heated within coiled pipe 78. In this manner, pipes 80 and 82 can be connected to a heating element such as a radiator (not shown) to form a closed system between the radiator and pipes 78, 80 and 82. Thus, the heat from hot, contaminated gases passing through liquid bath 4 can be utilized in a secondary heating system such as a radiator system to heat a dwelling or the like.

Figure 7:
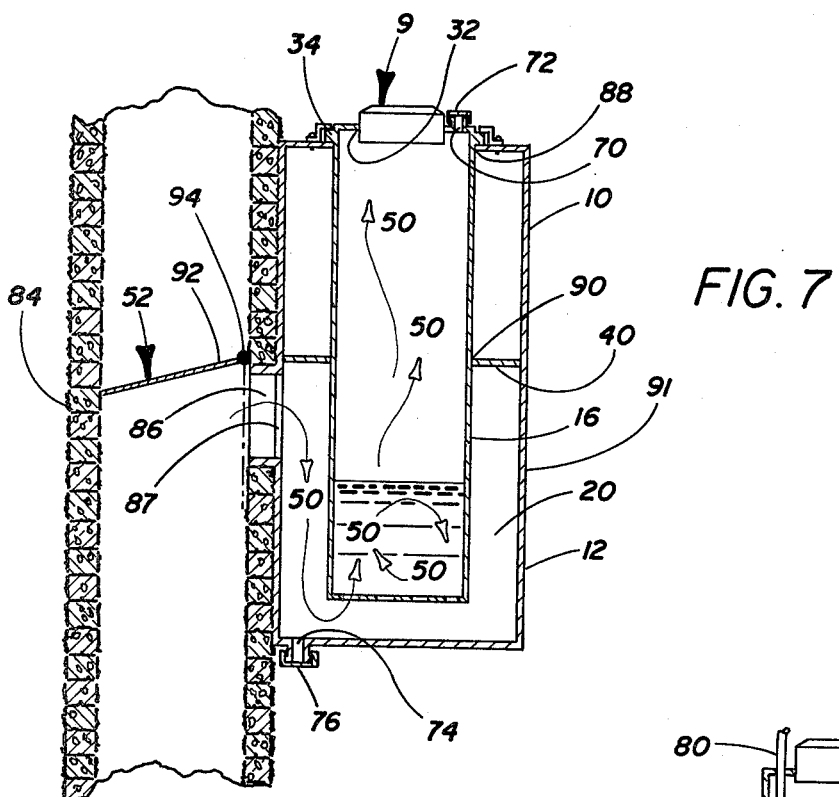
FIG. 7 is a side plan, cross-sectional view of a second embodiment of the present invention during its operation, and also showing openings in the bottom of the exhaust means.

Referring to FIG. 7, a second embodiment of the present invention is disclosed. In this embodiment, device 2 is attached to the side of a chimney or flue stack 84 in which an aperture 86 is provided. Container 12 has a portion thereof attached to the outside of flue stack 84 and has a second opening 87 in a side thereof corresponding to aperture 86 in flue stack 84. Exhaust chamber 16, as previously discussed in regard to the first embodiment, is partially disposed within liquid bath 4 in container 12 and in fluid communication therewith. Exhaust chamber 16 is partially disposed within liquid bath 4 and container 12 and supported by guide means 10 which includes a container having an aperture 88 at its upper end and an aperture 90 at its lower end, these apertures corresponding in dimension to the outer dimension of exhaust chamber 16 such that exhaust chamber 16 is disposed within apertures 88 and 90 and is restrained in its downward movement through these apertures by outer peripheral ledge 34 at its upper end, as previously discussed. In addition, exhaust chamber 16 also includes an upper central aperture 32 in which means 9 is fixedly disposed. Further, guide means 10 is integral with container 12 by means of connecting member 91 such that gases passing through aperture 86 in chimney 84 cannot escape into the atmosphere without passing through liquid bath 4. Guide means 10 also includes an upper limiting member 40 surrounding aperture 90 and attached to chimney 84 at the upper end of aperture 86. In addition, a gas escape means 52 is provided in chimney 84, means 52 including a flat plate 92 of similar dimensions to the inner dimension of chimney 84 and hingably attached to the inside of chimney 84 at the upper end of aperture 86 by hinge assembly 94. Plate 92 can be pivoted about hinge assembly 94 by any suitable means such as a motor (not shown), which is responsive to the operation of exhaust fan 9. In this manner, when exhaust fan 9 is in operation, the motor rotates plate 92 about hinge assembly 94 to prevent gases from escaping through chimney 84, as shown in FIG. 7. When exhaust fan 9 is in operation, the hot, contaminated gases must pass through aperture 86 in chimney 84 and through fluid space 20 between exhaust chamber 16 and container 12. In this manner, the system operates in substantially the identical manner in which the first embodiment operated. When exhaust fan 9 is not in operation, the motor releases plate 92 and allows it to fall by gravity to the dashed, vertical position, as shown in phantom in FIG. 7. In this manner, the hot, contaminated gases are prevented from passing through device 2, and must pass into the atmosphere through chimney or flue stack 84.

Figure 9:
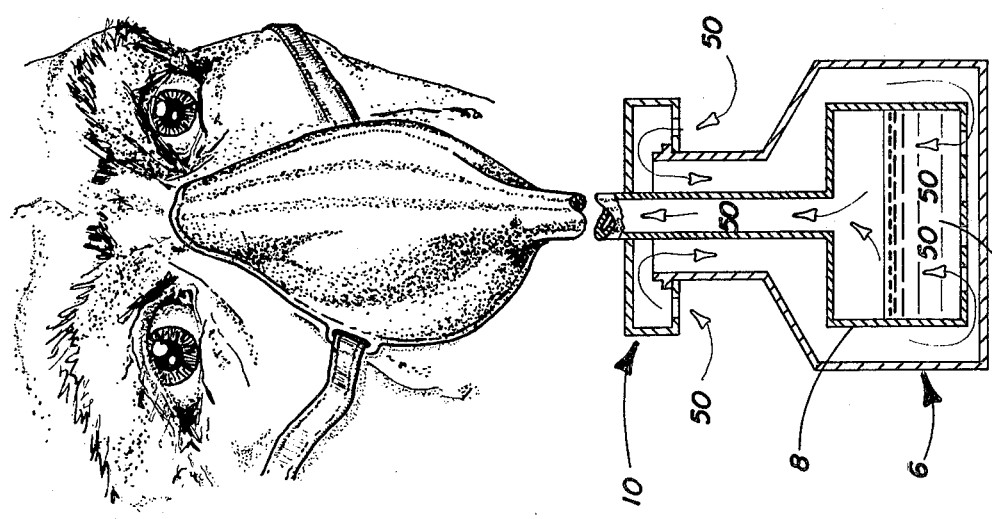
FIG. 9 is a side plan, cross-sectional view of an embodiment of the present invention utilized with a face mask.
Figure 8:
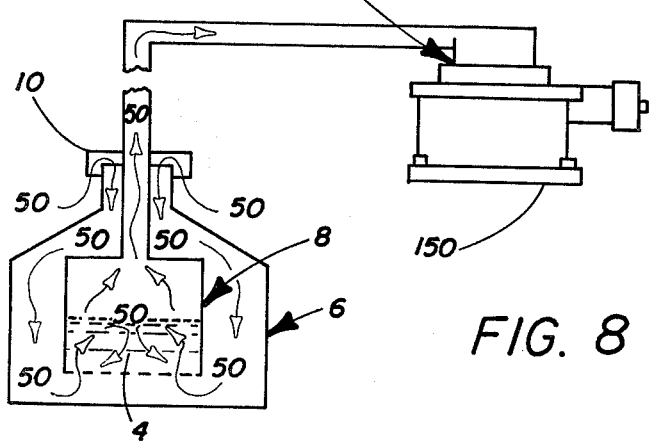
FIG. 8 is a schematic, side plan, cross-sectional view of an embodiment of the present invention utilized as a carburetor air filter.

It should be noted that the present invention is not limited for use in a chimney or flue stack. Rather, the present invention includes many uses. For example, as shown in FIG. 8, the present invention may be utilized as a filter for a carburetor 150, in which the carburetor provides the necessary vacuum. In this manner, the requirement for a paper air filter and container therefor in conventional automobiles would be eliminated. In addition, many advantages can be seen with the present purifying device over a paper air filter, i.e., there is no clogging of the filter, there is no periodic filter change (since all that would be required would be to drain the system and add fresh water), and the cylinders are kept cooler because of the heat exchanging relationship of liquid bath 4 with the incoming air. A still further example of the present invention can be seen in FIG. 9 in which the invention is utilized as a particle pollution facemask in which the vacuum is provided by an intake of breath. In utilizing the invention as a face mask, suitable valves would be needed. For example, a one-way valve in the air supply line would be needed to prevent the flow of air into liquid bath 4 during the exhalation part of the breathing cycle. Further, a one-way valve in the mask would be necessary to allow exhaled air to exit into the atmosphere but prevent air from the atmosphere from entering the mask during the intake part of the cycle.

The device of the present invention may be constructed from a wide variety of materials depending upon the environment in which the device is to operate. Thus, for example, the device may be prepared from temperature resistant light metals such as aluminum and the like when employed in certain domestic heating environments. In more rigorous environments requiring a higher temperature resistance, appropriate metals such as high temperature steels may be employed to construct the present device whereby continuous exposure to extremely high temperatures may be accomplished without damage thereto. Further, in instances where air purification is desirable and temperature extremes are not encountered, the device of the present invention may be constructed from such readily available materials as thermoplastic and thermosetting organic resinous materials. It is therefore apparent that the construction and utilization of the device of the present invention may be easily and economically accomplished to adapt to a wide variety of operative environments.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope as defined by the claims.

What is claimed is:

1. An energy transfer and air purifying device, comprising:
   containing means comprising a container for holding a quantity of liquid, said container having at least one opening therein;
   a quantity of liquid located within said container to receive incoming air; guide means surrounding said container and connected thereto for guiding said incoming air to said liquid; exhaust means comprising an exhaust chamber disposed within said guide means and having a lower end disposed in spaced-apart relationship within said container and in contact with said liquid, and an outlet means extending through said guide means and located at the opposite end thereof;
   a bottom end plate located at the lower end of said exhaust chamber, said bottom end plate defining a plurality of openings to permit the ingress and egress of said liquid, said openings being dimensioned and positioned adjacent the perimeter of said end plate in such a manner as to cause said liquid to rotate turbulently within said exhaust chamber so as to provide maximum scrubbing of said air by said liquid; and
   vacuum means adapted for fluid-tight communication with said container and said liquid to exert a fluid pressure sufficient to force said incoming air through said liquid and out of said exhaust chamber, and to cause the quantity of said liquid residing within said exhaust chamber to increase during its operation.

2. The energy transfer and air purifying device of claim 1 wherein said exhaust means and said containing means each include a bottom end, a fluid space being defined between said bottom ends.

3. The energy transfer and air purifying device of claim 1 wherein said exhaust means includes sides having openings therein.

4. The energy transfer and air purifying device of claim 1 wherein said guide means includes an outer wall surrounding said containing means, a fluid space being defined between said outer wall and said containing means.

5. The energy transfer and air purifying device of claim 1 wherein said guide means includes an upper limiting member.

6. The energy transfer and air purifying device of claim 5 wherein said upper limiting member is of a substantially planar configuration having an aperture therein of substantially identical dimension to the outer periphery of said exhaust means.

7. The energy transfer and air purifying device of claim 6 wherein said upper limiting member is attached to said containing means.

8. The energy transfer and air purifying device of claim 7 wherein said exhaust means includes an outer peripheral ledge.

9. The energy transfer and air purifying device of claim 8 wherein said exhaust means is disposed through said aperture of said upper limiting member and restrained therein by said outer peripheral ledge.

10. The energy transfer and air purifying device of claim 7 wherein said upper limiting member is supported by the upper end of a flue stack.

11. The energy transfer and air purifying device of claim 1 wherein said vacuum means includes a vacuum fan disposed within said outlet means of said exhaust means.

12. The energy transfer and air purifying device of claim 1 wherein said vacuum means includes a compressor means disposed below said containing means.

13. The energy transfer and air purifying device of claim 1 wherein said device includes a gas escape means.

14. The energy transfer and air purifying device of claim 13 wherein said gas escape means includes a damper means which is responsive to the operation of said changing means.

15. The energy transfer and air purifying device of claim 1 wherein said device is attached to a side of a flue stack structure.

16. The energy transfer and air purifying device of claim 1 wherein said exhaust means includes an inlet opening for replenishing said liquid bath.

17. The energy transfer and air purifying device of claim 1 wherein said containing means includes an outlet opening for draining said liquid bath.

18. The energy transfer and air purifying device of claim 1 wherein a second heat exchanging system is disposed within said exhaust means and said liquid, said second heat exchanging system including an inlet pipe and an outlet pipe which continuously circulates fluid through said second heat exchanging system.

19. The energy transfer and air purifying device of claim 18 wherein said heat exchanging system includes a coiled pipe disposed within said liquid bath and said containing means, said coiled pipe being attached at respective ends to said inlet pipe and said outlet pipe.

20. The energy transfer and air purifying device of claim 32 wherein said device is utilized as a carburetor filter.

21. The energy transfer and air purifying device of claim 1 wherein said device is utilized as a face mask.

22. An energy transfer and air purifying device comprising:

containing means comprising a container for holding a quantity of liquid, said container having at least one opening therein;

a quantity of liquid located within said container to receive incoming air;

exhaust means comprising an exhaust chamber having a lower end disposed in spaced-apart relationship within said container and in contact with said liquid, and an outlet means located at the opposite end thereof, said exhaust means also including an outer peripheral ledge;

a bottom end plate located at the lower end of said exhaust chamber, said bottom end plate defining a plurality of openings to permit the ingress and egress of said liquid, said openings being dimensioned and positioned adjacent the perimeter of said end plate in such a manner as to cause said liquid to rotate turbulently within said exhaust chamber so as to provide maximum scrubbing of said air by said liquid;

guide means surrounding said container and connected thereto for guiding said incoming air to said liquid, said guide means including an outer wall surrounding said containing means, a fluid space defined between said outer wall and said containing means, and an upper limiting member attached to said containing means, said upper limiting member being of a substantially planar configuration having an aperture therein of substantially identical dimension to the outer periphery of said exhaust means, wherein said exhaust means is disposed through said aperture of said upper limiting member and restrained therein by said outer peripheral ledge of said exhaust means; and vacuum means adapted for fluid-tight communication with said container and said liquid to exert a fluid pressure sufficient to force said incoming air through said liquid and out of said exhaust chamber, and to cause the quantity of said liquid within said exhaust chamber to increase during its operation.

23. The energy transfer and air purifying device of claim 22 wherein said upper limiting member is supported by the upper end of a flue stack.

24. The energy transfer and air purifying device of claim 22 wherein said vacuum means includes a vacuum fan disposed within said outlet means of said exhaust means.

25. The energy transfer and air purifying device of claim 22 wherein said vacuum means includes a compressor means disposed below said container means.

26. The energy transfer and air purifying device of claim 22 wherein said device includes a gas escape means, said gas escape means including a damper means which is responsive to the operation of said vacuum means.

27. The energy transfer and air purifying device of claim 22 wherein said exhaust means includes an inlet opening for replenishing said liquid and said containing means includes an outlet opening for draining said liquid bath.

28. The energy transfer and air purifying device of claim 22 wherein a second heat exchanging system is disposed within said exhaust means and said liquid, said second heat exchanging system including an inlet pipe, a coiled pipe disposed within said liquid and said containing means and an outlet pipe, said coiled pipe being attached at respective ends to said inlet pipe and said outlet pipe, wherein said second heat exchanging system continuously circulates fluid therein.

* * * * *